United States Patent
Kuwamura et al.

(10) Patent No.: US 6,437,013 B2
(45) Date of Patent: Aug. 20, 2002

(54) MICROCELLULAR POLYURETHANE ELASTOMER, AND METHOD OF PRODUCING THE SAME

(75) Inventors: Goro Kuwamura; Daisuke Nishiguchi; Satoshi Yamasaki; Takuya Chikamoto; Kazuto Usaka; Kaoru Ueno, all of Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/784,060

(22) Filed: Feb. 16, 2001

(30) Foreign Application Priority Data

Feb. 17, 2000 (JP) .......................................... 2000-39213
May 9, 2000 (JP) ......................................... 2000-135632

(51) Int. Cl.⁷ ............................................... C08G 18/10
(52) U.S. Cl. ........................ 521/174; 521/137; 521/159; 521/170
(58) Field of Search ................................ 521/170, 174, 521/137, 159

(56) References Cited

U.S. PATENT DOCUMENTS

| | | | |
|---|---|---|---|
| 3,829,505 A | | 8/1974 | Herold |
| 4,302,552 A | * | 11/1981 | Hongu et al. ............... 248/634 |
| 4,472,560 A | | 9/1984 | Kuyper et al. |
| 4,910,886 A | * | 3/1990 | Sullivan et al. ................ 36/43 |
| 5,223,547 A | * | 6/1993 | Harada et al. .............. 521/131 |
| 5,235,114 A | | 8/1993 | Reisch et al. |
| 5,728,745 A | | 3/1998 | Allen et al. |
| 5,856,372 A | | 1/1999 | Ho et al. |
| 5,965,778 A | | 10/1999 | Allen et al. |
| 6,063,825 A | * | 5/2000 | Isobe et al. ................. 521/108 |
| 6,100,310 A | * | 8/2000 | Ho .............................. 521/159 |
| 6,207,794 B1 | | 3/2001 | Yamasaki et al. |

FOREIGN PATENT DOCUMENTS

| | | |
|---|---|---|
| EP | 763555 | 3/1997 |
| EP | 0916866 A1 | 5/1999 |
| JP | 11106500 | 4/1999 |
| JP | 2001106780 A | 4/2001 |
| WO | 347202 | 7/1991 |
| WO | WO985424 | 3/1998 |

OTHER PUBLICATIONS

Eγwein, et al., "Use of Polyiminophosphazene Bases for Ring-Opening Polymerizations", *Macromol. Symp.*, vol. 107, 1996, pp. 331–340.

Schilling et al., "Carbon-13 NMR Determination of Poly(propylene oxide) Microstructure", *Macromolecules*, vol. 19, 1986, pp. 1337–1343.

Eγwein et al., "Anionic polymerization of oxirane in the presence of the polyiminophosphazene base t–Bu–$P_4$.", *Macromol. Rapid Commun.*, vol. 17, 1996, pp. 143–148.

* cited by examiner

*Primary Examiner*—John M. Cooney, Jr.
(74) *Attorney, Agent, or Firm*—Birch, Stewart, Kolasch & Birch, LLP

(57) ABSTRACT

The microcellular polyurethane elastomer of the present invention has (1) an overall density (D) of 100 kg/m³ or more but 900 kg/m³ or less, and
(2) overall density (D) and compression set (CS2, unit: %) satisfying the relationship shown by the following equation (1): and $$CS2 \leq 0.00008*D^2 - 0.091*D + 42 \qquad (1)$$

overall density (D) and cell diameter (X, unit: μm) on the skin surface satisfying the relationship shown by the following equation (2):

$$X \leq 120 e^{-0.0015 D} \qquad (2).$$

21 Claims, No Drawings

US 6,437,013 B2

MICROCELLULAR POLYURETHANE ELASTOMER, AND METHOD OF PRODUCING THE SAME

BACKGROUND OF THE INVENTION

1. Field of the Invention

The present invention relates to a microcellular polyurethane elastomer and a method of producing the same, more particularly to a microcellular polyurethane elastomer for a shoe sole and a method of producing the same.

2. Description of the Prior Art

A microcellular polyurethane elastomer has fine cells uniformly dispersed in a formed body, and is characterized by its forming density lower than that of a solid type polyurethane elastomer but higher than that of a flexible polyurethane foam. The microcellular polyurethane elastomer has been used for, e.g., shoe soles, gaskets, sealants and vibration insulators, and is still a very important material.

The representative microcellular polyurethane elastomer is produced by reacting a resin premix with an isocyanate component, wherein the resin premix is a mixture of a polyol component and one or more aids/additives, e.g., chain extender, catalyst, foam stabilizer and foaming agent.

It is known that polyester polyol and polyoxyalkylene polyol are used as the polyol component.

However, the microcellular polyurethane elastomer using a polyester polyol is insufficient in resistance to hydrolysis, although excellent in various physical properties, e.g., tensile strength, elongation and tear strength. Therefore, various attempts have been done to retard the hydrolysis, e.g., use of various types of additives and modification of chemical structures of polyester polyol. One of the methods proposed so far for improving resistance to the hydrolysis is to contain 0.001 to 0.007 mol of a compound having 3 active hydrogen atoms per 1000 g of the polyurethane resin produced, to cause a small quantity of branched structure. Such a compound, however, is still required to be further improved in resistance to hydrolysis.

On the other hand, use of polyoxypropylene polyol as the polyoxyalkylene polyol is known to improve resistance of the polyurethane to hydrolysis. However, a polyoxypropylene polyol has generally insufficient reactivity, and causes problems, e.g., extended demolding time and deterioration of green and final strength. These problems may be solved by increasing quantity of the catalyst, which, however, is accompanied by other problems, e.g., deterioration of processability and moldability resulting from shortened cream time or gel time.

Development of a polyoxyalkylene polyol exhibiting higher physical characteristics has been demanded even for the areas to which the conventional polyoxyalkylene polyol is sufficiently applicable with its resistance to hydrolysis, because of the problems associated with production of the polyol. One of the methods generally used for producing a polyoxyalkylene polyol is addition polymerization in which an active hydrogen compound is reacted with an alkylene oxide in the presence of potassium hydroxide (KOH) as the catalyst. However, it is known that, when propylene oxide as the common alkylene oxide is used for addition polymerization in the presence of a KOH catalyst, a mono-ol having an unsaturated group at the molecular chain piece terminal is produced increasingly as the by-product, as the polyoxypropylene polyol increases in molecular weight.

In general, mono-ol content corresponds to overall degree of unsaturation of polyoxypropylene polyol. The mono-ol has a lower molecular weight than the polyoxypropylene polyol produced by the main reaction, and greatly widens molecular weight distribution of the polyoxypropylene polyol and hence decreases average number of functional groups. It is also known that the mono-ol retards formation of the polymer networks for the urethane-forming reaction with polyisocyanate compound, resulting in deterioration of mechanical strength of polyurethane as the reaction product.

Attempts have been made to improve productivity of the polyoxyalkylene polyol synthesis, while inhibiting formation of mono-ol as the by-product. For example, a double metal cyanide complex (DMC) is proposed as the catalyst for addition polymerization of propylene oxide, as disclosed by publications of U.S. Pat. No. 3,829,505 and U.S. Pat. No. 4,472,560, which describe that DMC is an excellent catalyst for polymerization of propylene oxide.

A publication of U.S. Pat. No. 5,728,745 discloses a polyoxyalkylene polyol synthesized in the presence of an improved DMC as the catalyst, which gives a microporous elastomer showing a very high green strength and demolded in a short time, without causing deterioration of the final elastomer properties. Japanese Patent Publication No. 3-47202 describes, in its exmaples, that the polyoxyalkylene polyol synthesized in the presence of a DMC catalyst gives a polyurethane-based resin for shoe soles highly resistant to moist heat.

However, addition polymerization of ethylene oxide as the alkylene oxide in the presence of a DMC catalyst needs several steps, e.g., deactivation of the DMC catalyst by the reaction with an oxidant (e.g., an oxygen-containing gas, peroxide or sulfate), separation of the residual catalyst from the polyoxyalkylene polyol, and addition polymerization in the presence of a hydroxide of alkali metal (e.g., KOH), alkoxide of alkali metal or the like as the catalyst, as disclosed by U.S. Pat. No. 5,235,114. The inventors of the present invention have synthesized a polyoxyalkylene polyol in the presence of a DMC catalyst, and produced the microcellular polyurethane elastomer from the polyol, to find that the microcellular polyurethane elastomer fails to satisfy the desired characteristics they have pursued with respect to demolding time, durability-related characteristics (e.g., compression set), and cell shape in a specific range.

One of the catalysts other than the above-described ones for synthesizing polyoxyalkylene polyol is a phosphazene compound, disclosed by a publication of EPO 763,555, Macromol. Rapid Commun. Vol. 17, pp. 143 to 148, 1996, and Macromol. Symp. Vol. 107, pp. 331 to 340, 1996). When used as the catalyst for synthesizing polyoxyalkylene polyol, the phosphazene compound brings about advantages of controlled production of the mono-ol as the by-product and greatly improved productivity.

BRIEF SUMMARY OF THE INVENTION

Object of the Invention

It is an object of the present invention to provide a microcellular polyurethane elastomer which can solve the problems involved in the conventional techniques. It is another object of the present invention to provide a method of producing the same. More concretely, the present invention provides a microcellular polyurethane elastomer showing reduced demolding time, greatly reduced compression set and excellent mechanical properties, and, at the same time, excellent in appearances and coating characteristics, and also provides a method of producing the same.

SUMMARY OF THE INVENTION

The inventors of the present invention have found, after having extensively studied to develop a microcellular polyurethane elastomer of excellent characteristics and a method of efficiently producing the same, that the microcellular polyurethane elastomer can have excellent mechanical strength when it has an overall density (D) in a specific range and its compression set (CS2) and cell diameter on the skin surface satisfy specific correlations with its overall density (D), that the microcellular polyurethane elastomer can have excellent characteristics and its demolding time can be reduced to improve production efficiency by use of polyoxyalkylene polyol having a specific hydroxyl value (OHV), an overall degree of unsaturation and head-to-tail (H–T) linkage selectivity, and that the microcellular polyurethane elastomer can have reduced demolding time and excellent mechanical properties by use of a specific quantity of polyoxyalkylene polyol having a $W_{20}/W_{80}$ ratio as an index representing molecular weight distribution in a specific range, reaching the present invention.

The present invention, which solves the above problems, provides the following items (1) to (21).

(1) A microcellular polyurethane elastomer, having (a) an overall density (D) of 100 kg/m³ or more but 900 kg/m³ or less, (b) overall density (D) and compression set (CS2, unit: %) satisfying a relationship shown by the following equation (1)

$$CS2 \leq 0.00008*D^2 - 0.091*D + 42 \qquad (1)$$

and having overall density (D) and average cell diameter (X, unit: μm) observed on the skin surface satisfying a relationship shown by the following equation (2):

$$X \leq 120e^{-0.0015D} \qquad (2).$$

(2) The microcellular polyurethane elastomer of (1), wherein its overall density is 200 kg/m³ or more but 700 kg/m³ or less.

(3) The microcellular polyurethane elastomer of (1), containing the cells having an average diameter of 1 μm or more but 200 μm or less.

(4) The microcellular polyurethane elastomer of one of (1) to (3), wherein its overall density and compression set satisfy a relationship shown by the following equation (3):

$$CS2 \leq 0.00008*D^2 - 0.091*D + 40 \qquad (3).$$

(5) The microcellular polyurethane elastomer of one of (1) to (3), wherein its average cell diameter (X, unit: μm) observed on a skin surface satisfies the relationship shown by a following equation (4):

$$X \leq 110e^{0.0015D} \qquad (4).$$

(6) A microcellular polyurethane elastomer a polyol with a polyisocyanate compound to having an overall density (D) of 100 kg/m³ or more but 900 kg/m³ or less obtained by reacting, wherein above described polyol contains 50 wt. % or more of at least one polyoxyalkylene polyol having a hydroxyl value of 2 to 200 mg-KOH/g, an overall degree of unsaturation of 0.001 to 0.07 meq./g and a head-to-tail linkage selectivity of 95 mol % or more for that of the polyoxyalkylene polyol produced by addition polymerization of propylene oxide.

(7) The microcellular polyurethane elastomer of (6), wherein above described polyoxyalkylene polyol is produced in the presence of a compound having a P=N bond as a catalyst.

(8) The microcellular polyurethane elastomer of (1), obtained by reacting a polyol with a polyisocyanate compound, wherein above described polyol contains 50 wt. % or more of at least one polyoxyalkylene polyol having a hydroxyl value of 2 to 200 mg-KOH/g, an overall degree of unsaturation of 0.001 to 0.07 meq./g and a head-to-tail linkage selectivity of 95 mol % or more for that of the polyoxyalkylene polyol produced by addition polymerization of propylene oxide.

(9) The microcellular polyurethane elastomer of (8), wherein above described polyoxyalkylene polyol is produced in the presence of a compound having a P=N bond as a catalyst.

(10) The microcellular polyurethane elastomer of (8), wherein above described polyol contains 0.5 to 50 wt. % of polymer-dispersed polyol containing 1 to 50 wt. % of the polymer micro particles produced by polymerization of at least one monomer containing an ethylenically unsaturated group.

(11) The microcellular polyurethane elastomer of (10), wherein above described polymer-dispersed polyol is produced by polymerization of at least one monomer containing an ethylenically unsaturated group in at least one polyoxyalkylene polyol having a hydroxyl value of 2 to 200 mg-KOH/g, an overall degree of unsaturation of 0.001 to 0.07 meq./g and a head-to-tail linkage selectivity of 95 mol % or more for that of the polyoxyalkylene polyol produced by addition polymerization of propylene oxide.

(12) The microcellular polyurethane elastomer of (10), wherein above described polymer-dispersed polyol contains 10 to 45 wt. % of above described polymer micro particles.

(13) The microcellular polyurethane elastomer of one of (10) to (12), wherein above described monomer containing an ethylenically unsaturated group is one or more types of monomers selected from the group consisting of acrylonitrile, styrene, acrylamide and methyl methacrylate.

(14) The microcellular polyurethane elastomer of one of (10) to (13), wherein above described monomer containing an ethylenically unsaturated group contains 30 wt. % or more of styrene.

(15) The microcellular polyurethane elastomer of one of (1) to (14), which is obtained by reacting an isocyanate-terminated prepolymer with a polyol, above described prepolymer being obtained by reacting an aromatic polyester polyol with a polyisocyanate.

(16) A shoe sole which is made of the microcellular polyurethane elastomer of one of (1) to (15).

(17) A method of producing a microcellular polyurethane elastomer, obtained by reacting a polyol with a polyisocyanate compound to have (a) an overall density (D) of 100 kg/m³ or more but 900 kg/m³ or less, and (b) overall density (D) and compression set (CS2, unit: %) satisfying the relationship shown by the following equation (1): and $$CS2 \leq 0.00008*D^2 - 0.091*D + 42 \qquad (1)$$

and to have overall density (D) and average cell diameter (X, unit: μm) observed on the skin surface satisfying the relationship shown by the following equation (2):

$$X \leq 120 e^{-0.0015D} \quad (2)$$

wherein, above described polyol contains 50 wt. % or more of at least one polyoxyalkylene polyol having a hydroxyl value of 2 to 200 mg-KOH/g, an overall degree of unsaturation of 0.001 to 0.07 meq./g and a head-to-tail linkage selectivity of 95 mol % or more for that of the polyoxyalkylene polyol produced by addition polymerization of propylene oxide.

(18) The method of producing a finely foamed polyurethane elastmer of (17), wherein above described polyoxyalkylene polyol is produced in the presence of a compound having a P=N bond as a catalyst.

(19) The method of producing a finely foamed polyurethane elastmer of (17), which is obtained by reacting a polyol with a polyisocyanate compound, wherein above described polyol contains 0.5 to 50 wt. % of polymer-dispersed polyol containing 1 to 50 wt. % of the polymer micro particles produced by polymerization of at least one monomer containing an ethylenically unsaturated group.

(20) The method of producing a finely foamed polyurethane elastmer of one of (17) to (19), which is obtained by reacting a polyol with a polyisocyanate compound, wherein above described polyisocyanate compound is an isocyanate-terminated prepolymer obtained by reacting an aromatic polyester polyol with a polyisocyanate.

(21) The method of producing a finely foamed polyurethane elastmer of (20), wherein above described polyisocyanate compound contains 20 wt. % or more of the isocyanate-terminated prepolymer obtained by reacting an aromatic polyester polyol with a polyisocyanate.

DETAILED DESCRIPTION OF THE PREFERRED EMBODIMENTS

The present invention will be described in detail below by the preferred embodiments.

Microcellular polyurethane elastomer

The microcellular polyurethane elastomer has an overall density of 100 to 900 kg/m³, preferably 200 to 800 kg/m³, more preferably 200 to 700 kg/m³, wherein overall density means density of the whole elastomer including its surface layer section. Keeping overall density at 100 kg/m³ or more gives the elastomer of improved mechanical strength and allows the formed elastomer to exhibit excellent mechanical properties. The microcellular polyurethane elastomer of the present invention has following mechanical properties; hardness (Asker C): 5 to 95, tensile strength (TB): 0.5 to 20 MPa, maximum elongation (EB): 100 to 700%, tear strength (TR): 0.5 to 50 kN/m, and compression set (CS2): 3 to 35%, which vary depending on its overall density.

Compression set (CS2) is an important property for the microcellular polyurethane elastomer, especially for shoe soles, because it determines the product quality. The elastomer of lower CS2 value suffers less dimensional changes when used repeatedly, and enables to keep desired elastic feeling for extended periods. It is determined in accordance with JIS K-6262, where the circular specimen 29 mm in diameter, cut from a sheet, was tested under the conditions of test temperature: 50±1° C., test time: 6 hours, and compression ratio: 50%. The compression set thus determined is referred to as the "CS2" value in this specification.

The CS2 value of the microcellular polyurethane elastomer of the present invention satisfies the relationship shown by the following equation (1):

$$CS2 \leq 0.00008 * D^2 - 0.091 * D + 42 \quad (1)$$

preferably the following equation (3):

$$CS2 \leq 0.00008 * D^2 - 0.091 * D + 40 \quad (3)$$

more preferably the following equation (5): and $$CS2 \leq 0.00008 * D^2 - 0.091 * D + 38 \quad (5)$$

especially preferably the following equation (6):

$$CS2 \leq 35 * e^{-0.0025 * D} \quad (6).$$

The microcellular polyurethane elastomer should have sufficient mechanical strength, when it has a CS2 value in the above range.

Surface characteristics are also important for the foamed polyurethane elastomer for shoe soles. It is needless to say that surface characteristics greatly affect quality of the uncoated product, let alone coated surface of the product post-treated by coating. It is preferable that the microcellular polyurethane elastomer has a glossy surface without defects, e.g., flow marks and pinholes, before being coated, and keeps the glossy surface without defects, e.g., uneven coloration, after being coated.

The inventors of the present invention have found that the surface characteristics are determined by size of the cells on the skin surface, where the skin surface of the present invention means the surface of the microcellular polyurethane elastomer sheet in contact with the mold, e.g., of aluminum 12.5 by 150.0 by 250.0 mm in inner dimensions, in which it is formed. The surface (150.0 by 250.0 mm) in contact with the mold bottom was observed for its cell diameters by a microcamera at a total of five position, the four corners and center, for the portion excluding the 20 mm wide sections from the edges in the length and breadth directions. The average diameter of these cells at each of the 5 points is determined by image processor/analyzer, and the average cell diameter X on the skin surface is determined by averaging the average diameters at these points.

The cell diameter (X, unit: μm) observed on the skin surface of the microcellular polyurethane elastomer of the present invention preferably satisfies the relationship shown by the following equation (2):

$$X \leq 120 e^{0.0015D} \quad (2)$$

more preferably the following equation (4): and $$X \leq 110 e^{0.0015D} \quad (4)$$

still more preferably the following equation (7):

$$X \leq 100 e^{0.0015D} \quad (7)$$

Controlling the average cell diameter on the skin surface in the above range substantially increases thickness of the skin layer. The inventors of the present invention have also found that increasing thickness of the skin layer improves mechanical properties, e.g., tensile strength, of the elastomer.

The average cell diameter inside of the microcellular polyurethane elastomer of (e.g. the average cell diameter as measured without skin layer) the present invention is preferably 1 $\mu$m or more but 200 $\mu$m or less, more preferably 1 $\mu$m or more but 150 $\mu$m or less, still more preferably 1 $\mu$m or more but 100 $\mu$m or less, and most preferably 5 $\mu$m or more but 100 $\mu$m or less. The average cell diameter inside of the microcellular polyurethane elastomer of the present invention is determined by observing diameters of the cells at the four planes of the specimen in the sectional direction (perpendicular to the skin surface) by a microcamera, and finding the average cell diameter by an image processor/analyzer, where the specimen is prepared by, e.g., cutting the sheet of microcellular polyurethane elastomer, formed in an aluminum mold of 12.5 by 150.0 by 250.0 mm in inner dimensions, into a shape of 3 cm in the length direction and 1 cm in the breadth direction from the central portion, and removing the 4 mm thick upper and lower sections.

Keeping the average cell diameter at 200 $\mu$m or less, especially 100 $\mu$m or less, can inhibit growth of the cell diameter, and give the microcellular polyurethane elastomer of good feeling of touch and improved mechanical properties.

Production of microcellular polyurethane elastomer

The microcellular polyurethane elastomer of the present invention, having the above-described characteristics, is produced by reacting a polyol including a polyoxyalkylene polyol having a specific structure as the main component, with a polyisocyanate compound in the presence of a foaming agent, catalyst and foam stabilizer. Each component is described first in detail.

Polyol

The polyol for the present invention contains 50 wt. % or more of at least one polyoxyalkylene polyol having a hydroxyl value (OHV) of 2 to 200 mg-KOH/g, an overall degree of unsaturation of 0.001 to 0.07 meq./g, and head-to-tail (H–T) linkage selectivity of 95 mol % or more for that of the polyoxyalkylene polyol produced by addition polymerization of propylene oxide.

Polyoxyalkylene polyol

The polyoxyalkylene polyol for the present invention has an OHV value of 2 to 200 mg-KOH/g, preferably 9 to 120 mg-KOH/g, more preferably 10 to 100 mg-KOH/g, still more preferably 20 to 80 mg-KOH/g, and most preferably 20 to 60 mg-KOH/g, viewed from mechanical properties and demolding characteristics of the microcellular polyurethane elastomer.

The polyoxyalkylene polyol for the present invention also has an overall degree of unsaturation of 0.07 meq./g or less, preferably 0.05 meq./g or less, more preferably 0.04 meq./g or less, and most preferably 0.03 meq./g or less, in order to improve mechanical strength of the microcellular polyurethane elastomer and allow it to exhibit its inherent properties in the early stage.

Keeping an overall degree of unsaturation at 0.07 meq./g or less greatly improves mechanical strength of the microcellular polyurethane elastomer. The lower limit of an overall degree of unsaturation is not limited for the present invention, but around 0.001 meq./g.

The polyoxyalkylene polyol for the present invention also has a head-to-tail (H–T) linkage selectivity of 95 mol % or more, preferably 96 mol % or more, more preferably 97 mol % or more, where the selectivity results from the cleavage mode of oxirane ring in addition polymerization of propylene oxide. Keeping head-to-tail (H–T) linkage selectivity at 95 mol % or more can keep polyoxyalkylene polyol viscosity in an adequate range, develop the compatibility with an aid/additive, e.g., foam stabilizer, and also inhibit growth of the average cell diameter and deterioration of processability of the microcellular polyurethane elastomer.

The polyoxyalkylene polyol for the present invention also has a $W_{20}/W_{80}$ ratio of 1.5 or more but below 3.0, where $W_{20}$ and $W_{80}$ are widths of the peaks at 20 and 80% of the highest peak in the gel permeation chromatography (GPC) elution curve.

The causes for broadening the molecular weight distribution of polyoxyalkylene polyol include formation of mono-ol by the side-reaction of propylene oxide, and formation of a high-molecular-weight component as the by-product. The mono-ol (corresponding to an overall degree of unsaturation, defined in this specification) has a lower molecular weight than the polyoxyalkylene polyol produced by the main reaction, and slower than the component formed by the main reaction in peak holding time in the GPC elution curve. Decreasing concentration of mono-ol makes an overall degree of unsaturation of the polyol decrease, as a result, mechanical strength of the microcellular polyurethane elastomer is greatly improved.

Therefore, a polyoxyalkylene polyol containing a higher proportion of the high-molecular-weight component has a higher viscosity than the one containing a lower proportion of the high-molecular-weight component, increasing viscosity of the resin premix containing a catalyst, foam stabilizer, foaming agent or the like and also viscosity of the isocyanate-terminated prepolymer obtained by the reaction with a polyisocyanate, and hence causing problems, e.g., deteriorated processability and flowability of the microcellular polyurethane elastomer, to deteriorate its formability and grow its cell diameter.

The polyoxyalkylene polyol for the present invention is preferably produced from propylene oxide as the main monomer and ethylene oxide. Introduction of ethylene oxide into the terminal of the polyoxyalkylene polyol structure with the propylene oxide as the main chain allows the polyol to exhibit a sufficient reaction rate, and also can sufficiently increase molecular weight of the microcellular polyurethane elastomer. Content of ethylene oxide in the polyoxyalkylene polyol for the present invention is preferably 30 wt. % or less, more preferably 5 to 30 wt. %, and most preferably 10 to 25 wt. %. Rate for producing a primary hydroxyl group at the terminal of the polyoxyalkylene polyol is preferably around 50 mol % or more, more preferably 70 mol % or more, still more preferably 75 mol % or more, and most preferably 80 mol % or more.

It is also preferable that the polyoxyalkylene polyol for the present invention is produced in the presence of a compound having the P=N bond as a catalyst. More preferably, the compound is one or more types of compound selected from the group consisting of phosphazenium compound, phosphazene compound and phosphine oxide compound, of which a phosphazenium compound is most preferable. The polyoxyalkylene polyol produced in the presence of a phosphazenium compound preferably has a hydroxyl value of 2 to 200 mg-KOH/g, an overall degree of unsaturation of 0.001 to 0.07 meq./g and a head-to-tail linkage selectivity of 95 mol % or more for that of the polyoxyalkylene polyol produced by addition polymerization of propylene oxide. Although the polyoxyalkylene polyol is preferably produced in the presence of a phosphazenium compound, a hydroxide of alkali metal, e.g., cesium hydroxide (CsOH), may be used in combination with the phosphazenium compound, so long as the effects of the present invention are not damaged. The catalyst for producing the polyoxyalkylene polyol will be described in detail later.

A polyol having a structure other than the above polyoxyalkylene polyol may be used for production of the microcellular polyurethane elastomer of the present invention. The polyoxyalkylene polyol for the present invention accounts for 50 wt. % or more of the polyols, preferably 70 wt. % or more and more preferably 80 wt. % or more. The polyol, other than the polyoxyalkylene polyol, which can be used for the present invention, will be described in detail later.

The polyoxyalkylene polyol preferably has a number-average molecular weight of 1,000 to 12,000 for the microcellular polyurethane elastomer for shoe soles. More preferably, it has a number-average molecular weight of 2,000 to 8,000, and ethylene oxide added to its terminals.

Production of polyoxyalkylene polyol

The polyoxyalkylene polyol for the present invention is also referred to as polyoxyalkylene polyether polyol, which is an oligomer or polymer produced by ring opening polymerization of an alkylene oxide in the presence of a catalyst and active hydrogen compound as the initiator. One or more types of initiators and alkylene oxides may be used for the present invention.

Catalyst for producing polyoxyalkylene polyol

The catalyst for producing polyoxyalkylene polyol for the present invention is particularly preferably a compound having the P=N bond in its molecular structure. The example of such a compound is one or more types of compound selected from the group consisting of phosphazenium compound, phosphazene compound and phosphine oxide compound.

The preferable phosphazenium compounds are a salt of hosphazenium cation and inorganic anion, represented by the chemical formula (1), disclosed by Japanese Patent Application Laid-Open No. 11-106500,

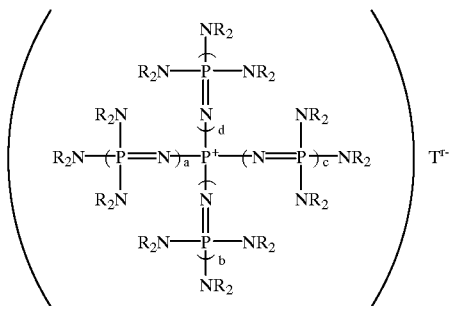

and phosphazenium compound, represented by the chemical formula (2):

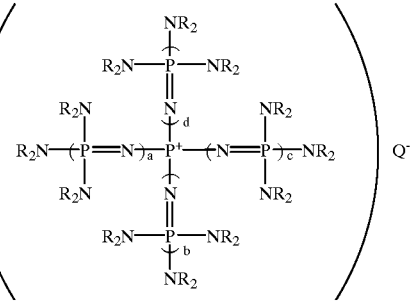

where, (a), (b), (c) and (d) in the chemical formulas (1) and (2) are each an integer of 0 to 3, which are not simultaneously zero; R in the chemical formulas (1) and (2) is a hydrocarbon group of 1 to 10 carbon atoms, which may be the same or different, wherein two Rs on the same nitrogen atom may form a ring structure; (r) in the chemical formula (1) is an integer of 1 to 3, and representing number of phosphazenium cation; $T^r$ in the chemical formula (1) represents an inorganic anion having a valence number of (r); and $Q^-$ in the Equation (2) represents hydroxy anion, alkoxy anion, aryloxy anion or carboxy anion, more concretely, tetrakis[tris(dimethylamino)phosphoranilideneamino] phosphonium hydroxide, tetrakis[tris(dimethylamino) phosphoranilideneamino]phosphonium methoxide, tetrakis [tris(dimethylamino)phosphoranilideneamino] phosphonium ethoxide, tetrakis[tri(pyrrolidin-1-yl) phosphoranilideneamino]phosphonium tert-butoxide, or the like.

The phosphazene compounds useful for the present invention are disclosed by EP-763555, e.g., 1-tert-butyl-2,2,2-tris(dimethylamino)phosphazene,
1-(1,1,3,3-tetramethylbutyl)-2,2,2-tris(dimethylamino)phosphazene,
1-ethyl-2,2,4,4,4-pentakis(dimethylamino)-$2\lambda^5,4\lambda^5$-catenadi(phosphazene),
1-tert-butyl-4,4,4-tris(dimethylamino)-2,2-bis[tris(dimethylamino) phosphoranilideneamino]-$2\lambda^5,4\lambda^5$-catenadi(phosphazene),
1-(1,1,3,3-tetramethylbutyl)-4,4,4-tris(dimethylamino)-2,2-bis[tris(dimethylamino)phosphoranilideneamino]-$2\lambda^5,4\lambda^5$-catenadi(phosphazene),
1-tert-butyl-2,2,2-tri(1-pyrrolidinyl) phosphazene, and
7-ethyl-5,11-dimethyl-1,5,7,11-tetraaza-$6\lambda^5$-phosphaspiro [5,5]undeca-1(6)-ene.

The phosphine oxide compounds useful for the present invention are disclosed by Japanese Patent Application No. 11-296610, e.g., tris[tris(dimethylamino)phosphoranilideneamino]phosphine oxide, and
tris[tris(dimethylamino)phosphoranilideneamino]phosphine oxide.

Of the above compounds having the P=N bond, preferable ones are phosphazenium compounds and phosfine compounds, and more preferable ones are phosphazenium compounds.

Initiator

The active hydrogen compounds useful as the initiator for producing polyoxyalkylene polyol include those having an activated hydrogen atom on the oxygen or nitrogen atom.

Of the active hydrogen compounds described below, more preferable ones include ethylene glycol, propylene glycol, dipropylene glycol, glycerin, trimethylolpropane, pentaerythritol, sorbitol, and sucrose.

(1) Active hydrogen compounds having an activated hydrogen atom on oxygen atom

The active hydrogen compounds useful for the present invention and having an activated hydrogen atom on the oxygen atom include water, polyvalent carboxylic acids having a carboxyl group, carbamic acid, polyhydric alcohols having a hydroxyl group, sucrose and its derivatives, and aromatic compounds having a hydroxyl group.

The polyvalent carboxylic acids having a carboxyl group include malonic acid, succinic acid, maleic acid, fumaric acid, adipic acid, itaconic acid, butanetetracarboxylic acid, phthalic acid, isophthalic acid, terephthalic acid, trimellitic acid, and pyromellitic acid.

The carbamic acids include N,N-diethyl carbamate, N-carboxypyrrolidone, N-carboxyaniline and N,N'-dicarboxy-2,4-toluenediamine.

The polyhydric alcohols having a hydroxyl group include ethylene glycol, propylene glycol, diethylene glycol, dipropylene glycol, 1,3-propanediol, 1,3-butanediol, 1,4-butanediol, 1,6-hexanediol, 1,4-cyclohexanediol, trimethylolpropane, glycerin, diglycerin, pentaerythritol and dipentaerythritol.

The saccharides and their derivatives include glucose, sorbitol, dextrose, fructose and sucrose.

The aromatic compounds having a hydroxyl group include 2-naphthol, 2, 6-dihydroxynaphthalene, bisphenol A, bisphenol F, hydroquinone, resorcin, and bis(hydroxyethyl)terephthalate.

(2) Active hydrogen compounds having an activated hydrogen atom on nitrogen atom The active hydrogen compounds useful for the present invention and having an activated hydrogen atom on the nitrogen atom include aliphatic and aromatic amines.

The aliphatic and aromatic amines include n-propylamine, isopropylamine, n-butylamine, isobutylamine, sec-butylamine, tert-butylamine, cyclohexylamine, benzylamine, β-phenylethylamine, aniline, o-toluidine, m-toluidine, and p-toluidine.

The polyvalent amines include ethylenediamine, di(2-aminoethyl)amine, hexamethylenediamine, 4,4'-diaminodiphenylmethane, tri(2-aminoethyl)amine, N,N'-dimethylethylenediamine, N,N'-diethylethylendiamine, and di(2-methylaminoethyl)amine.

Alkylene oxide

The alkylene oxide useful for producing polyoxyalkylene polyol for the present invention preferably has propylene oxide as the main component, and is more preferably a mixture of 50 wt. % or more of propylene oxide and one or more other alkylene oxide compounds. Use of this quantity of propylene oxide allows to control oxypropylene group content in the polyoxyalkylene polyol at 50 wt. % or more. The polyoxyalkylene polyol has a sufficiently low viscosity, when its oxypropylene group content is controlled at 50 wt. % or more to give a resin premix of good flowability. The alkylene oxide compounds which can be used in combination with propylene oxide include epoxy compounds, e.g., ethylene oxide, 1,2-butylene oxide, 2,3-butylene oxide, styrene oxide, cyclohexene oxide, epichlorohydrin, epibromohydrin, methyl glycidyl ether, aryl glycidyl ether, and phenyl glycidyl ether.

Of these, ethylene oxide is more preferable to be used in combination with propylene oxide.

Other polyols

A polyol having a structure other than the above polyoxyalkylene polyol may be used for production of the microcellular polyurethane elastomer of the present invention, so long as it does not damage the effects of the present invention. Such polyols useful for the present invention include di- to hexa-valent polyhydric alcohols, polyester polyols (including polyester polyols, aromatic polyester polyols and polycaprolactone polyols for common purposes), polycarbonate polyols, and polymer-dispersed polyols.

(Polyhydric alcohol)

The polyhydric alcohols include di-valent alcohol, e.g., 1,3-propanediol, 1,4-butanediol, ethylene glycol, diethylene glycol, triethylene glycol, propylene glycol, dipropylene glycol, tripropylene glycol, butanediol, pentanediol, hexanediol, cyclohexanediol and neopentyl glycol; tri-valent alcohols, e.g., glycerin, trimethylolethane and trimethylolpropane; tetra-valent alcohols, e.g., pentaerythritol and diglycerin; and hexa-valent alcohols, e.g., sorbitol.

(Polyester polyol for common purposes)

The polyester polyol for common purposes includes polyester polyol produced by polycondensation of a dicarboxylic acid and polyhydric alcohol. The dicarboxylic acids for producing the polyester polyols include adipic acid, succinic acid, azelac acid, suberic acid and ricinolic acid. The polyhydric alcohols include ethylene glycol, propylene glycol, butanediol, hexanediol, neopentylglycol, diethylene glycol, triethylene glycol, pentanediol, cyclohexanediol, polyoxyalkylene polyol, polytetramethylene ether glycol, glycerin, trimethylolpropane, trimethylolethane and pentaerythritol.

(Polycaprolactone polyol)

The polycaprolactone polyol is a polyol from ε-caprolactone and polyhydric alcohol. These polyols have, in general, a number-average molecular weight of 500 to 4,000 and hydroxyl value of around 30 to 240 mg-KOH/g. The polyhydric alcohols for the above polyester polyols may be used for producing the polycaprolactone polyols.

(Polycarbonate polyol)

The polycarbonate polyols are liner chain aliphatic or alicyclic polyols produced by condensation of a polyhydric alcohol (e.g., 1,4-butanediol and 1,6-hexanediol) and dimethyl or diethyl carbonate, and shown by the following general formula (3):

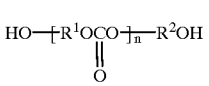

(3)

where, $R^1$ and $R^2$ are each an aliphatic alkylene or alicyclic alkylene group, and may be the same or different.

They have, in general, a hydroxyl value of around 60 to 200 mg-KOH/g.

(Aromatic polyester polyol)

The aromatic polyester polyols are produced by the interesterification between synthetic resin, e.g., polyethylene terephthalate, and polyhydric alcohol, or polycondensation of an aromatic carboxylic acid (e.g., o-, m- or p-phthalic acid) and polyhydric alcohol. The preferable polyhydric alcohols for the above purpose include polyoxyalkylene polyols and polytetramethylene ether glycols, in addition to the above-described polyhydric alcohols. They may be used either alone or in combination. The aromatic ester polyol preferably has a hydroxyl value of 10 to 150 mg-KOH/g, more preferably 15 to 100 mg-KOH/g and acid value of 0.7 mg-KOH/g or less, more preferably 0.5 mg-KOH/g or less. Use of the aromatic polyester polyol as the polyol of isocyanate-terminated prepolymer helps improve mechanical properties of the microcellular polyurethane elastomer.

(Polymer-dispersed polyol)

The polymer-dispersed polyol means the one dispersed with the vinyl polymer particles (hereinafter sometimes referred to as simply the polymer micro particles) partly containing the graft polymer, produced by dispersion polymerization of at least one monomer containing ethylenically unsaturated group (e.g., acrilonitrile and styrene) in a polyol in the presence of a radical initiator (e.g., azobisisobutylonitrile). Use of the polymer-dispersed polyol brings about the effect of sufficiently increasing hardness of the microcellular polyurethane elastomer.

The polyols useful for the present invention include polyester polyols and polyoxyalkylene polyols having 2 to 6 functional groups on the average, the above-described polyoxyalkylene polyols having specific properties for the present invention being more preferable. The polymer produced by the dispersion polymerization preferably has an average particle size of 0.1 to 10 $\mu$m.

The polymer-dispersed polyol preferably has a hydroxyl value of 5 to 99 mg-KOH/g, more preferably 10 to 59 mg-KOH/g, for the microcellular polyurethane elastomer to exhibit sufficiently high mechanical strength.

The polymer-dispersed polyol for the present invention preferably contains the polymer micro particles at 1 to 50 wt. %, based on the polyoxyalkylene polyol, more preferably 10 to 45 wt. %. The monomer containing an ethylenically unsaturated group is preferably one or more types selected from the group consisting of acrylonitrile, styrene, acrylamide and methyl methacrylate. Use of the monomer containing an ethylenically unsaturated group, selected from the above group, for the polymer-dispersed polyol helps improve mechanical properties of the microcellular polyurethane elastomer. It is particularly preferable to use the polymer-dispersed polyol containing styrene at 30 wt. % or more, still more preferably 40 wt. % or more, and most preferably 50 wt. % or more. When the polymer micro particles based on an acrylonitrile/styrene copolymer are used for the polymer-dispersed polyol, whiteness of the microcellular polyurethane elastomer is affected by styrene content. Controlling styrene content helps produce the microcellular polyurethane elastomer of white appearances suitable for white-colored shoe soles.

Polyisocyanate compound

Any polyisocyanate compound which is used for production of polyurethane may be used for production of the microcellular polyurethane elastomer of the present invention.

The polyisocyanate compounds useful for the present invention include diisocyanates, e.g., tolylene diisocyanate (including various types of mixtures of the isomers), diphenylmethane diisocyanate (including various types of mixtures of the isomers), 3,3'-dimethyl-4,4'-biphenylene diisocyanate, norbornane diisocyanate, 1,4-phenylene diisocyanate, tetramethylxylylene diisocyanate, naphthalene diisocyanate, dicyclohexylmethane-4,4'-diisocyanate, isophorone diisocyanate, hexamethylene diisocyanate, hydrogenated xylene diisocyanate, 1,4-cyclohexyl diisocyanate, 1-methyl-2,4-diisocyanate cyclohexane and 2,4,4-trimethyl-1,6-diisocyanate-hexane; and triisocyanates, e.g., 4,4',4"-triphenylmethane triisocyanate and tris(4-phenylisocyanate) thiophosphate.

The other isocyanates useful for the present invention include the above-described polyisocyanates modified with urethane, isocyanurate, carbodiimide or burette; and multi-functional isocyanates, e.g., crude tolylene diisocyanate, polymethylene isocyanate and polyphenyl isocyanate.

Of these, the polyisocyanate or carbodiimide-modified polyisocyanate is preferable for production of the suitable urethane-modified isocyanate-terminated prepolymer by the reaction with polyol.

The isocyanate-terminated prepolymer molecule contains the isocyanate group at 0.3 to 30 wt. % (as isocyanate group content in the isocyanate-terminated prepolymer), preferably 1 to 30 wt. %, more preferably 4 to 25 wt. %, most preferably 5 to 25 wt. %.

The polyol for production of the isocyanate-terminated prepolymer is not limited. Some examples include polyoxyalkylene polyol, polyester polyol, polybutadiene polyol and polycarbonate polyol. They may be used either alone or in combination.

Particularly preferable one is an aromatic polyester polyol or the polyoxyalkylene polyol for the present invention, which is reacted with a polyisocyanate to produce the urethane-modified isocyanate-terminated prepolymer.

Especially, use of an aromatic polyester polyol as the polyol for the isocyanate-terminated prepolymer increases content of the isocyanate-terminated prepolymer from the aromatic polyester polyol and polyisocyanate to 20 wt. % or more, preferably 30 wt. % or more, more preferably 40 wt. % or more, increasing its reactivity and hence giving the microcellular polyurethane elastomer of excellent mechanical strength.

Foaming agent

The foaming agents useful for production of the microcellular polyurethane elastomer of the present invention include water, cyclopentane, trichloromethane, trichloromonofluoromethane, 1,1,2-trichlorotrifluoromethane, 1,1-dichloro-2,2,2-trifluoroethane, and 1,1-dichloro-1-monofluoroethane. They may be used either alone or in combination. Of these, the more preferable one is water used alone.

Catalyst

Various known catalysts may be used for the present invention. They include amines, e.g., triethylamine, tripropylamine, tributylamine, morpholine, N-methylmorpholine, N-ethylmorpholine, dimethylcyclohexylamine, 1,4-diazabicyclo-(2,2,2)-octane (hereinafter referred to as TEDA), TEDA salt, N,N,N',N'-tetramethylhexamethylenediamine, N,N,N',N'-tetramethylpropylenediamine, N,N,N',N',N"-pentamethyldiethylenetriamine, trimethylaminoethylpiperazine, N,N-dimethylcyclohexylamine, N,N-dimethylbenzylamine, N-methylmorpholine, N-ethylmorpholine, bis(dimethylaminoalkyl)piperazine, N,N,N',N'-tetramethylethylenediamine, N,N-diethylbenzylamine, bis(N,N-diethylaminoethyl)adipate, N,N,N',N'-tetramethyl-1,3-butanediamine, N,N-dimethyl-β-phenylethylamine, 1,2-dimethylimidazole, and 2-methylimidazole; organotin compounds, e.g., tin octylate, tin oleate, tin laurate, dibutyltin diacetate and dibutyltin dilaurate; and organolead compounds, e.g., lead octylate and lead naphthenate. They may be used either alone or in combination, preferably at 0.1 to 10 wt. parts per 100 wt. parts of the polyol, more preferably 0.1 to 5 wt. parts.

Chain extender

The suitable chain extender is a polyol having a low molecular weight of 400 or less. These compounds include propylene glycol, dipropylene glycol, ethylene glycol, diethylene glycol, 1,4-butanediol, 1,3-butanediol, neopentyl glycol, 1,6-hexanediol, glycerin, bishydroxyethoxy benzene, bishydroxyethyl terephthalate and diethoxy resorcin. Two or more types of the chain extenders may be used. The preferable extenders are ethylene glycol and 1,4-butanediol. It is preferable to use the chain extender at 3 to 60 wt. parts per 100 wt. parts of the polyol, more preferably 3 to 50 wt. parts.

Foam stabilizer

The foam stabilizer for the present invention is not limited, so long as it is generally used for production of polyurethane foams, and known organosilicon-based surfactants may be used. The amount used is preferably at 0.1 to 20 wt. parts per 100 wt. parts of the polyol, more preferably at 0.2 to 5 wt. parts. The examples of the stabilizers include SRX-274C, SF-2969, SE-2961 and SF-2962 (Trade Name, produced by Toray/Dow Corning Silicone); L-5309, L-5302, L-3601, L-5307 and L-3600 (Trade Name, produced by NIPPON UNICAR COMPANY LTD.).

Other additives

The other additives useful for the present invention include a yellowing inhibitor, ultraviolet ray absorber, antioxidant, flame retardant and colorant.

Method of producing the microcellular polyurethane elastomer

The microcellular polyurethane elastomer of the present invention is produced by mixing, under agitation, a resin premix with a polyisocyanate compound, wherein the resin premix is a mixture of the polyol for the present invention (including polyoxyalkylene polyol), and additives, e.g., chain extender, water as the foaming agent, catalyst and foaming agent, which is prepared beforehand. It is preferable to keep an NOC index normally at 0.8 to 1.3, more preferably 0.9 to 1.2, wherein NOC index is a ratio of moles of the active hydrogen in the total active hydrogen compounds (polyol, chain extender and water as the foaming agent) to moles of the isocyanate group in the polyisocyanate compound.

The mixing with agitation is effected normally by a low- or high-pressure circulation type foaming machine at 20 to 60° C., although varying depending on size of the molded product of the microcellular polyurethane elastomer. When a low-pressure foaming machine is used in an open mold, for example, the mixture of the resin premix and polyisocyanate compound is injected into the mold, the open mold is quickly closed by a clamp, and the mixture is cured at 70° C. for 5 to 20 min by, e.g., hot wind in a drier.

When cured, the microcellular polyurethane elastomer is withdrawn from the mold, to analyze its properties. The after cure, when required, is effected normally under the conditions of, e.g., 70° C. for 24 or 2 hours.

The microcellular polyurethane elastomer is normally incorporated with 0.1 to 5 wt. parts of water as the foaming agent, 0.1 to 20 wt. parts of a foam stabilizer, 0.1 to 10 wt. parts of a catalyst for forming urethane and 3 to 60 wt. parts of a chain extender, all per 100 wt. parts of the polyol, in order to satisfy the above required characteristics.

<<Applications of the microcellular polyurethane elastomer>>

The microcellular polyurethane elastomer of the present invention is excellent in mechanical properties, e.g., tensile strength, 100% modulus, maximum elongation, tear strength and compression set, and also excellent in productivity coming from its reduced demolding time. The shoe sole of the microcellular polyurethane elastomer of these characteristics provides good feeling when the shoe on the sole is worn and is excellent in durability. Controlling cell diameter on the skin surface in a specific range keeps good surface and coating characteristics. Therefore, the microcellular polyurethane elastomer of the present invention can suitably find various applications, including shoe soles, gaskets for electric appliances, gaskets for industrial parts, seat mats and foot mats, vibration and sound insulators, and shock absorbers.

EFFECT OF THE INVENTION

The present invention provides a microcellular polyurethane elastomer, excellent in mechanical properties, e.g., tensile strength, 100% modulus, maximum elongation, tear strength and compression set, and suitable for, e.g., shoe soles of excellent surface and coating characteristics. The microcellular polyurethane elastomer of the present invention, with its excellent mechanical properties, can be lower in density than the conventional elastomer of the equivalent mechanical properties, and can reduce weight of the products for various purposes.

In particular, a microcellular polyurethane elastomer retaining excellent mechanical properties can be obtained even with a reduced demolding time.

The shoe sole or the like of such a polyurethane elastomer provides good feeling when the shoe on the sole is worn and is excellent in durability and surface characteristics.

EXAMPLES

The present invention will be described by Examples, which by no means limit the present invention, wherein parts and percentages mean wt. parts and wt. %, respectively.

Analytical methods

The characteristics determined in Examples and Comparative Examples were measured by the following methods:

Analysis of polyoxyalkylene polyol (1) Hydroxyl value (OHV, unit: mg-KOH/g) and an overall degree of unsaturation (C=C, unit: meq./g)

These properties were determined in accordance with JIS K-1557, in which the number of hydroxyl groups in a polyoxyalkylene polyol corresponds to that of an active hydrogen compound used as an initiator.

(2) Head-to-tail (H–T) linkage selectivity (unit: mol %)

The $^{13}$C-NMR spectral pattern of the polyoxyalkylene polyol was determined by a $^{13}$C-nuclear magnetic resonance (NMR) analyzer (JEOL LTD., 400 MHz) with deuterated chloroform as the solvent. This selectivity was determined by the ratio of the signal of methyl group (16.9 to 17.4 ppm) in the head-to-tail linkage in the oxypropylene segment to the signal of methyl group (17.7 to 18.5 ppm) in the head-to-head bond in the oxypropylene segment. The methyl group to which each signal is relevant was determined, based on the values in the report by F. C. Schiling and A. E. Tonelli, Macromolecules, 19, 1337–1343 (1986).

(3) $W_{20}/W_{80}$ ratio (as an index representing molecular weight distribution of polyoxyalkylene polyol, unit: dimensionless)

$W_{20}$ and $W_{80}$ are widths of the peaks at 20 and 80% of the highest peak in the gel permeation chromatography (GPC) elution curve of the polyoxyalkylene polyol. The GPC analysis conditions are given below:

Analyzer: Shimadzu's LC-6A system

Detector: Shimadzu's differential refractometer RID-6A

Separation column: Showa Denko's ShodexGPC, KF series (4 columns KF-801, 802, 802.5 and 803 connected in series)

Elutant: Tetrahydrofuran for liquid chromatogram

Liquid flow rate: 0.8 ml/min

Column temperature: 40° C.

(4) Terminal oxyethylene group content in polyoxyalkylene polyol (unit: wt. %)

The oxyethylene group content was determined by $^1$H-NMR analysis for the polyoxyalkylene polyol dissolved in deuterated chloroform.

(5) Rate for producing the primary OH group at the terminals (unit: mol %)

The rate for producing the primary OH group at the terminals was determined by $^{13}$C-NMR analysis for the polyoxyalkylene polyol dissolved in deuterated chloroform.

Methods for analyzing properties of the microcellular polyurethane elastomer

The sheet of the microcellular polyurethane elastomer, formed in an aluminum mold 12.5 by 150.0 by 250.0 mm in inner dimensions, was cut by a punching die of given dimensions, to prepare the specimen for analyzing the properties.

(6) Average diameter of the cells observed on the skin surface (unit: μm)

The skin surface means the sheet (of the microcellular polyurethane elastomer) in contact with an aluminum mold in which it is formed, 12.5 by 150.0 by 250.0 mm in inner dimensions. The surface (150.0 by 250.0 mm) in contact with the mold bottom was observed for its cell diameters by a microcamera (Shimadzu's MICRO CCD SCOPE/CCD-F2) at the four corners and center, for the portion excluding the 20 mm wide sections from the edges in the length and breadth directions. The average diameter of these cells at each of the 5 points is determined by image processor/analyzer, and the average cell diameter on the skin surface is determined by averaging the average diameters at these points.

(7) Average cell diameter inside of the microcellular polyurethane elastomer (unit: μm)

The average cell diameter was determined for the inside of the microcellular polyurethane elastomer sheet, formed in an aluminum mold of 12.5 by 150.0 by 250.0 mm in inner dimensions by observing diameters of the cells at the four planes of the specimen in the sectional direction (perpendicular to the skin surface) by a microcamera (Shimadzu's MICRO CCD SCOPE/CCD-F2), and finding the average cell diameter by an image processor/analyzer, where the specimen was prepared by cutting the sheet into a shape of 3 cm in the length direction and 1 cm in the breadth direction from the central portion, and removing the 4 mm thick upper and lower sections.

(8) Overall density (unit: kg/m$^3$)

The overall density was determined by dividing weight of the sheet demolded from the mold by its volume.

(9) Hardness (unit: dimensionless)

The hardness was determined by an Asker C hardness meter in accordance with JIS K-6301.

(10) Tensile strength ($T_B$, unit: MPa), 100% modulus ($M_{100}$, unit: MPa) and maximum elongation ($E_B$, unit: %)

The specimen for determining the above properties was prepared by a dumbbell No. 1 die, and analyzed in accordance with JIS K-6251.

(11) Tear strength ($T_R$, unit: kN/m)

The specimen was prepared by an angle die with no notch, and analyzed in accordance with JIS K-6252.

(12) Compression set (unit: %)

The circular specimen, 29 mm in diameter, was prepared from the sheet, and analyzed in accordance with JIS K-6262 at 55±1° C. for 24 hours, with the specimen set at a compression ratio of 25%. The compression set thus determined is referred to as "CS."

The 29 mm diameter circular specimen prepared from the sheet was also analyzed in accordance with JIS K-6262 at 50±1° C. for 6 hours, with the specimen set at a compression ratio of 50%. The compression set thus determined is referred to as "CS2."

(13) Viscosity of the resin premix (unit: mPa·s at 25° C.)

Viscosity at 25° C. of the resin premix compositions shown in Tables 5 and 6 was determined by the B type viscometer (Tohki Sangyo's) in accordance with JIS K-1557.

(14) Demolding time of the microcellular polyurethane elastomer (unit: sec)

Demolding time is defined as time required for the elastomer to be demoldable from a mold after the mixed liquid of resin premix and polyisocyanate compound is injected into the mold. To be demoldable means the state of the microcellular polyurethane elastomer sheet to be completely cured and demolded from the mold without causing any problem, e.g., partial exfoliation on the sheet surface or sheet missing.

(15) Surface characteristics of the microcellular polyurethane elastomer

The microcellular polyurethane elastomer, demolded out of the mold, was visually observed to determine its surface characteristics, based on the comprehensive judgement with respect to gloss, and presence or absence of flow marks or pinholes, and marked with A: good, B: average, and C: not good.

(16) Coating characteristics of the microcellular polyurethane elastomer

The microcellular polyurethane elastomer, demolded out of the mold, was stored at room temperature for 24 hours, and sprayed with a black coating material (Asahi Pen's lacquer spray). It was then dried at room temperature for 24 hours, visually observed for gloss and presence or absence of uneven coloration on the coated surface, and marked with A: good, B: slightly inferior in gloss or uneven coloration slightly observed, and C: lack of gloss or uneven coloration observed.

Stock materials

The stock materials used in Examples and Comparative Examples are described.

Polyoxyalkylene polyol

Synthesis Example 1

First, synthesis of the polyoxyalkylene polyols used in Examples will be described.

Polyoxyalkylene polyol A

A mixture of 1 mol of glycerin and 0.01 mol of tetrakis [tris(dimethylamino)phosphoranilideneamino] phosphonium hydroxide {[(Me$_2$N)$_3$P=N]$_4$P$^+$OH$^-$} (or P5OH) was desiccated under a vacuum at 100° C. for 6 hours, addition-polymerized with propylene oxide at 80° C. and 0.372 MPaG (3.8 kg/cm$^2$G, where G stands for gauge pressure) as the highest pressure, and then addition-polymerized with ethylene oxide at 100° C., to prepare a polyoxyalkylene polyol having a hydroxyl value of 28 mg-KOH/g.

The polyoxyalkylene polyol thus prepared had a terminal oxyethylene group content of 15 wt. %, an overall degree of unsaturation of 0.014 meq./g, and a head-to-tail linkage selectivity of 96.8 mol %.

Polyoxyalkylene polyols B, C and D were prepared in the same manner as for Polyoxyalkylene polyol A except that hydroxyl value and hydroxyl group number were changed, as shown in Table 1, where propylene oxide was used as the main monomer, and ethylene oxide was used in a quantity to keep a terminal oxyethylene group content at 15 wt. % in the polyoxyalkylene polyol. Polyoxyalkylene polyols E and F were prepared in the same manner except that the terminal oxyethylene group content was kept at 20 wt. %. Dipropylene glycol was used as the active hydrogen compound for production of the polyoxyalkylene polyol having a hydroxyl group number of 2, and glycerin for production of the polyoxyalkylene polyol having a hydroxyl group number of 3. The analysis results of Polyoxyalkylene polyols A, B, C, D, E and F are given in Table 1.

TABLE 1

| | Polyoxyalkylene polyol | | | | | |
|---|---|---|---|---|---|---|
| | A | B | C | D | E | F |
| Hydroxyl group number | 3 | 3 | 2 | 2 | 3 | 2 |
| Hydroxyl value (mg-KOH/g) | 28 | 22 | 28 | 22 | 28 | 28 |
| Terminal oxyethylene group content (wt. %) | 15 | 15 | 15 | 15 | 20 | 20 |
| Rate for producing the primary OH group at the terminals (mol %) | 80.8 | 80.3 | 81.2 | 80.9 | 90.9 | 91.5 |
| Overall degree of unsaturation (meq./g) | 0.014 | 0.018 | 0.013 | 0.017 | 0.011 | 0.010 |
| Head-to-tail linkage selectivity (mol %) | 96.8 | 97 | 97.2 | 97 | 98 | 98.3 |
| $W_{20}/W_{80}$ | 2.67 | 2.63 | 2.61 | 2.59 | 2.51 | 2.48 |

Synthesis Example 2

Second, synthesis of the polyoxyalkylene polyols used in Comparative Examples will be described.

Polyoxyalkylene polyol G

A mixture of 1 mol of glycerin and 0.37 mol of potassium hydroxide (hereinafter referred to as KOH) was desiccated under vacuum at 100° C. for 6 hours, addition-polymerized with propylene oxide at a reaction temperature of 115° C. and 0.490 MPaG (5.0 kg/cm²G) as the highest pressure, and then addition-polymerized with ethylene oxide at a reaction temperature of 115° C., to prepare a polyoxyalkylene polyol having a hydroxyl value of 28 mg-KOH/g. The polyoxyalkylene polyol thus prepared had a terminal oxyethylene group content of 15 wt. %, an overall degree of unsaturation of 0.085 meq./g, and a head-to-tail linkage selectivity of 96.3 mol %, as determined in the same manner as in Synthesis example 1.

Polyoxyalkylene polyol H was also prepared for Comparative Example in the same manner as for Polyoxyalkylene polyol G except that hydroxyl value and hydroxyl group number were set at 28 mg-KOH/g and 2, respectively. Propylene oxide was used as the main monomer, and ethylene oxide was used in a quantity to keep a terminal oxyethylene group content at 15 wt. % in the polyoxyalkylene polyol. Dipropylene glycol was used as the active hydrogen compound for production of the polyoxyalkylene polyol having a hydroxyl group number of 2. The analysis results of Polyoxyalkylene polyols G and H are given in Table 2.

TABLE 2

| | Polyoxyalkylene polyol | |
|---|---|---|
| | G | H |
| Hydroxyl group number | 3 | 2 |
| Hydroxyl value (mg-KOH/g) | 28 | 28 |
| Terminal oxyethylene group content (wt. %) | 15 | 15 |
| Rate for producing the primary OH group at the terminals (mol %) | 78.3 | 77.9 |
| Overall degree of unsaturation (meq./g) | 0.085 | 0.088 |

TABLE 2-continued

| | Polyoxyalkylene polyol | |
|---|---|---|
| | G | H |
| Head-to-tail linkage selectivity (mol %) | 96.3 | 96.6 |
| $W_{20}/W_{80}$ | 2.61 | 2.65 |

Synthesis Example 3

Synthesis of the other polyoxyalkylene polyols used in Comparative Examples will be described.

Polyoxyalkylene polyol I:

A mixture of 100 wt. parts of MN1000 (Trade Name, polyoxypropylene polyol having an OHV of 168 mg-KOH/g (produced by Mitsui Chemicals, Inc.) and 0.05 wt. parts of the so-called double metal cyanide complex (DMC) catalyst, composed of zinc-cobalt cyanide, zinc chloride, water and dimethoxyethanol, was addition-polymerized with propylene oxide at 90° C. and 0.392 MPaG (4.0 kg/cm²G) as the highest pressure, to prepare a polyoxypropylene polyol having a hydroxyl value of 33 mg-KOH/g. The effluent was treated with ammonia water to extract the DMC, and washed with water to purify polyoxypropylene polyol. Then, 0.26 wt. parts of potassium hydroxide (KOH) was added to 100 wt. parts of the polyoxypropylene polyol, and the mixture was desiccated under a vacuum at 100° C. for 6 hours.

The polyoxypropylene polyol was then addition-polymerized with ethylene oxide at 100° C., to prepare a polyoxyalkylene polyol having an OHV of 28 mg-KOH/g. It had a terminal oxyethylene group content of 15 wt. %, an overall degree of unsaturation of 0.010 meq./g, and a head-to-tail linkage selectivity of 85.4 mol %, as determined in the same manner as in Synthesis example 1.

Polyoxyalkylene polyols J, K, L, M and N were also prepared for Comparative Example in the same manner as for Polyoxyalkylene polyol G except that hydroxyl value and hydroxyl group number were set at the levels shown in Table 3.

Propylene oxide was used as the main monomer, and ethylene oxide was used in a quantity to keep a terminal oxyethylene group content at 15 wt. % in the polyoxyalkylene polyol terminal, except for Polyoxyalkylene polyols M and L, for which ethylene oxide was used in a quantity to keep the terminal oxyethylene group content at 20 wt. %. Polyoxypropylene polyol (Diol-700 (Trade Name), produced by Mitsui Chemicals, Inc.), produced by addition polymerization of dipropylene glycol and propylene oxide, was used as the active hydrogen compound for production of the polyoxyalkylene polyol having a hydroxyl group number of 2, and polyoxypropylene polyol (MN1000 (Trade Name), produced by Mitsui Chemicals, Inc.), produced by addition polymerization of glycerin and propylene oxide, for production of the polyoxyalkylene polyol having a hydroxyl group number of 3. The analysis results of Polyoxyalkylene polyols I, J, K, L, M and N thus prepared are given in Table 3.

TABLE 3

| | Polyoxyalkylene polyol | | | | | |
|---|---|---|---|---|---|---|
| | I | J | K | L | M | N |
| Hydroxyl group number | 3 | 3 | 2 | 2 | 3 | 2 |
| Hydroxyl value (mg-KOH/g) | 28 | 22 | 28 | 22 | 28 | 28 |
| Terminal oxyethylene group content (wt. %) | 15 | 15 | 15 | 15 | 20 | 20 |
| Rate for producing the primary OH group at the terminals (mol %) | 78.3 | 78.0 | 78.5 | 79.1 | 88.6 | 88.5 |
| Overall degree of unsaturation (meq./g) | 0.010 | 0.015 | 0.011 | 0.013 | 0.007 | 0.008 |
| Head-to-tail linkage selectivity (mol %) | 85.4 | 86.4 | 87.2 | 87.0 | 85.0 | 86.0 |
| $W_{20}/W_{80}$ | 4.18 | 4.06 | 4.60 | 5.15 | 4.50 | 4.81 |

Polymer-dispersed polyol

The polymer-dispersed polyols for the present invention will be described by the examples, which by no means limit the present invention.

The stock materials, abbreviations and analytical methods for the examples will be described below:

Polyoxyalkylene polyols A, I; (The polyoxyalkylene polyol used for synthesis of the polymer-dispersed polyol is hereinafter referred to as Base PPG)

Ethylenically unsaturated monomer-1; acrylonitrile (hereinafter referred to as AN)

Ethylenically unsaturated monomer-2; styrene (hereinafter referred to as St)

Chain transfer agent; triethylamine (hereinafter referred to as TEA)

Radical initiator; azobisisobutyronitrile (hereinafter referred to as AIBN)

(17) Hydoxy value (abbreviated by OHV, unit: mg-KOH/g) and viscosity (abbreviated by η, unit: mPa·s at 25° C.) of the polymer-dispersed polyol These properties were determined in accordance with JIS K-1557.

(18) Polymer concentration (unit: wt. %)

The polymer-dispersed polyol was well dispersed in methanol, and the mixture was centrifugally separated, to measure weight of the methanol insolubles. For the polymer-dispersed polyol from acrylonitrile (AN) as the sole ethylenicllly unsaturated monomer, the polymer concentration was determined by the nitrogen balance by the elementary analysis.

Base PPG, put fully in a 1-liter autoclave equipped with a thermometer, agitator and liquid-sending device, was heated to 120° C., with agitation. Then, a mixture composed of 58.5 wt. parts of Base PPG, 12.45 wt. parts of AN, 29.05 wt. parts of St, 0.55 wt. parts of V-59, 2.76 wt. parts of IPA and 0.28 wt. parts of TEA prepared beforehand was continuously charged into the autoclave, and the polymer-dispersed polyol was continuously discharged from the discharge port. The reaction conditions were 0.444 MPaG (3.5 kgf/cm$^2$G) as pressure and 50 min as residence time. The effluent, collected after the steady-state conditions were attained, was thermally treated under a vacuum at 120° C. and 2.66 kPa (20 mmHg, abs.) for 3 hours, to prepare Polymer-dispersed polyols O and P after the unreacted ethylenically unsaturated monomer, and residual additives, e.g., decomposed polymerization initiator and chain transfer agent were removed. The results are given in Table 4.

TABLE 4

| | Polymer-dispersed polyol | |
|---|---|---|
| | O | P |
| Base PPG | A | I |
| Hydroxyl group number | 3 | 3 |
| Hydroxyl value (mg-KOH/g) | 20.1 | 20.2 |
| Polymer concentration (wt. %) | 30.5 | 30.2 |
| St/AN wt. ratio | 70/30 | 70/30 |

Polyisocyanate compound

Isocyanate-terminated prepolymer Q:

Isocyanate-terminated prepolymer Q was prepared by the following procedure: 676 wt. parts of 4,4-diphenylmethane diisocyanate (Cosmonate PH (Trade Name), produced by Mitsui Chemicals, Inc.) was reacted with 324 wt. parts of polyoxypropylene diol (Diol-1000 (Trade Name), produced by Mitsui Chemicals, Inc.), having an OHV of 112 mg-KOH/g) in a nitrogen atmosphere in a separable flask at 80° C. for 2 hours. It had an isocyanate group content of 20 wt. %.

Isocyanate-terminated prepolymer R:

A mixture of 100 parts of terephthalic acid and 125 parts of tripropylene glycol was charged in a four-necked flask, equipped with an agitation rod, dehydration tube, nitrogen gas introduction tube and thermometer. Next, a nitrogen gas was introduced into the flask, water produced was distilled off while carefully controlling bumping, and the content was heated to 200° C. The effluent was incorporated with 0.045 parts of tetraisopropyl titanate as the titanium-based catalyst, after its acid value was decreased to 20 or less, and system pressure was slowly reduced to a vacuum of 1.33 kPa, at which water was further distilled off. The reaction was continued until acid value of the effluent was decreased to 1 mg-KOH/g or less, to prepare Aromatic polyester polyol S. The reaction system was returned back to the normal pressure, and the effluent was cooled to 80° C. and incorporated with 3.4 wt. parts of distilled water. The mixture was continuously heated for 2 hours, with agitation, to deactivate the titanium-based catalyst, and water was distilled off under a vacuum. Aromatic polyester polyol S thus prepared had an acid value of 0.3 mg-KOH/g and hydroxyl value of 113.1 mg-KOH/g.

Isocyanate-terminated prepolymer R was prepared in the same manner as for Isocyanate-terminated prepolymer Q, except that Aromatic polyester polyol S was used as the polyol working as the isocyanate modifier.

Catalyst

MINICO; Trade Name, produced by Katuzai Chemical, amine catalyst (triethylenediamine)

Chain extender

Ethylene glycol; produced by Wako Pure Chemical Industries'

Foam stabilizer

SF-2962; Trade Name, produced by Toray/Dow Corning Silicone, silicone foam stabilizer, Foaming agent Ion-exchanged water (hereinafter merely referred to as water)

Examples and Comparative Examples

Examples and Comparative Examples will be described below.

Each composition of polyoxyalkylene polyol, the chain extender and water as the foaming agent, foam stabilizer and catalyst (this composition is hereinafter referred to as resin premix) is described in Table 5 or 6, where unit for all of the items is wt. parts, except for molar ratio.

Table 5 describes the compositions of the present invention, prepared by Examples 1 to 5, each comprising Polyoxyalkylene polyol A, B, C, D, E or F, and the one prepared by Example 4 additionally containing Polymer-dispersed polyol O. Table 6 describes the compositions prepared by Comparative Examples, wherein the resin premix prepared by Comparative Example 1 comprised Polyoxyalkylene polyols G and H, each polymerized in the presence of a KOH catalyst, and those prepared by Comparative Examples 2 to 6 comprised Polyoxyalkylene polyol I, J, K, L, M or N, each polymerized in the presence of a DMC catalyst, the one prepared by Comparative Example 5 additionally containing Polymer-dispersed polyol P.

Example 1

A mixture of 372 wt. parts of Polyoxyalkylene polyol A, 563 wt. parts of Polyoxyalkylene polyol C, 45 wt. parts of the chain extender, 5 wt. parts of water, 5 wt. parts of the catalyst and 10 wt. parts of the foam stabilizer was agitated for mixing at 500 rpm in a stainless steel container for 5 min, to prepare the resin premix. A polyisocyanate compound was added to the resin premix in a quantity to keep an isocyanate index NCO/OH at 1.0, i.e., ratio of moles of the active hydrogen in the resin premix to moles of the isocyanate group in the polyisocyanate compound, wherein the resin premix and polyisocyanate compound were kept at 40° C. beforehand. The mixture was agitated for further mixing at 1,500 rpm in a homomixer for 3 sec, and immediately injected into an aluminum mold, 12.5 by 150.0 by 250.0 mm in inner dimensions, kept at 40° C. beforehand. The mold was closed, and put in an oven, also kept at 40° C. beforehand. The microcellular polyurethane elastomer thus prepared was analyzed for its demolding time, and various properties after it was demolded out of the mold.

Table 7 gives viscosity of the resin premix, and Table 8 demolding time and Table 9 properties of the microcellular polyurethane elastomer.

Example 2

The microcellular polyurethane elastomer was prepared in the same manner as in Example 1, except that Polyoxyalkylene polyols A and C were replaced by Polyoxyalkylene polyols B and D. Table 5 gives its composition (where unit for all of the items is wt. parts, except that for NCO/OH), and Table 8 its demolding time and Table 9 properties.

Example 3

The microcellular polyurethane elastomer was prepared in the same manner as in Example 1, except that Polyoxyalkylene polyols A and C were replaced by Polyoxyalkylene polyols E and F. Table 5 gives its composition, and Table 8 its demolding time and Table 9 properties.

Example 4

The microcellular polyurethane elastomer was prepared in the same manner as in Example 1, except that Polyoxyalkylene polyols A and C were replaced by Polyoxyalkylene polyol C and Polymer-dispersed polyol O. Table 5 gives its composition, and Table 8 its demolding time and Table 9 properties.

Example 5

The microcellular polyurethane elastomer was prepared in the same manner as in Example 3, except that Isocyanate-terminated prepolymer R was used as the polyisocyanate compound. Table 5 gives its composition, and Table 8 its demolding time and Table 9 properties.

TABLE 5

|  |  |  | Example 1 | Example 2 | Example 3 | Example 4 | Example 5 |
|---|---|---|---|---|---|---|---|
| Resin premix | Polyoxy-alkylene polyol | A | 372 | — | — | — | — |
|  |  | B | — | 376 | — | — | — |
|  |  | C | 563 | — | — | 683 | — |
|  |  | D | — | 569 | — | — | — |
|  |  | E | — | — | 372 | — | 372 |
|  |  | F | — | — | 563 | — | 563 |
|  | Polymer-dispersed polyol | O | — | — | — | 171 | — |
|  | Chain extender |  | 45 | 36 | 45 | 100 | 45 |
|  | Water |  | 5 | 4 | 5 | 6 | 5 |
|  | Catalyst |  | 5 | 5 | 5 | 20 | 5 |
|  | Foam stabilizer |  | 10 | 10 | 10 | 20 | 10 |
| Isocyanate-terminated prepolymer |  | Q | 519 | 431 | 519 | 902 | — |
|  |  | R | — | — | — | — | 519 |
| NCO/OH |  |  | 1.0 | 1.0 | 1.0 | 1.0 | 1.0 |

Comparative Example 1

The microcellular polyurethane elastomer was prepared in the same manner as in Example 1, except that Polyoxyalkylene polyols A and C were replaced by Polyoxyalkylene polyols G and H produced in the presence of a KOH catalyst. Table 6 gives its composition (where unit for all of the items is wt. parts, except that for NCO/OH), Table 7 viscosity of the resin premix, and Table 8 its demolding time and Table 10 properties.

Comparative Example 2

The microcellular polyurethane elastomer was prepared in the same manner as in Example 1, except that Polyoxyalkylene polyols A and C were replaced by Polyoxyalkylene polyols I and K produced in the presence of a DMC catalyst. Table 6 gives its composition, Table 7 viscosity of the resin premix, and Table 8 its demolding time and Table 10 properties of the microcellular polyurethane elastomer.

Comparative Example 3

The microcellular polyurethane elastomer was prepared in the same manner as in Example 1, except that Polyoxyalkylene polyols A and C were replaced by Polyoxyalkylene polyols J and L produced in the presence of a DMC catalyst. Table 6 gives its composition, and Tables 8 and 10 its demolding time and properties.

Comparative Example 4

The microcellular polyurethane elastomer was prepared in the same manner as in Example 1, except that Polyoxyalkylene polyols A and C were replaced by Polyoxyalkylene polyols M and N produced in the presence of a DMC catalyst. Table 6 gives its composition, and Table 8 its demolding time and Table 10 properties.

Comparative Example 5

The microcellular polyurethane elastomer was prepared in the same manner as in Example 1, except that Polyoxyalkylene polyols A and C were replaced by Polyoxyalkylene polyols K produced in the presence of a DMC catalyst and Polymer-dispersed polyol P. Table 6 gives its composition, and Table 8 its demolding time and Table 10 properties.

TABLE 9

|  | Example 1 | Example 2 | Example 3 | Example 4 | Example 5 |
|---|---|---|---|---|---|
| Overall density (kg/m$^3$) | 510 | 510 | 510 | 510 | 510 |
| Average cell diameter on the skin surface ($\mu$m) | 44 | 42 | 40 | 45 | 40 |
| Diameter of inside cell ($\mu$m) | 15–80 | 15–80 | 15–80 | 20–100 | 15–80 |
| Average diameter of inside cell ($\mu$m) | 40 | 42 | 45 | 55 | 50 |
| Hardness (Asker C) | 70 | 69 | 70 | 75 | 72 |
| $T_B$ (MPa) | 4.2 | 4.5 | 4.5 | 5.5 | 5.6 |
| $M_{100}$ (MPa) | 2.5 | 2.7 | 2.8 | 3.4 | 3.3 |
| $E_B$ (%) | 390 | 400 | 400 | 400 | 360 |
| $T_R$ (kN/m) | 26 | 29 | 31 | 40 | 38 |
| CS (%) | 5 | 3 | 6 | 7 | 5 |
| CS2 (%) | 9 | 8 | 9 | 8 | 9 |

TABLE 6

|  |  |  | Comparative Example 1 | Comparative Example 2 | Comparative Example 3 | Comparative Example 4 | Comparative Example 5 |
|---|---|---|---|---|---|---|---|
| Resin premix | Polyoxy-alkylene polyol | G | 372 | — | — | — | — |
|  |  | H | 563 | — | — | — | — |
|  |  | I | — | 372 | — | — | — |
|  |  | J | — | — | 376 | — | — |
|  |  | K | — | 563 | — | — | 683 |
|  |  | L | — | — | 569 | — | — |
|  |  | M | — | — | — | 372 | — |
|  |  | N | — | — | — | 563 | — |
|  | Polymer-dispersed polyol | P | — | — | — | — | 171 |
|  | Chain extender |  | 45 | 45 | 36 | 45 | 100 |
|  | Water |  | 5 | 5 | 4 | 5 | 6 |
|  | Catalyst |  | 5 | 5 | 5 | 5 | 20 |
|  | Foam stabilizer |  | 10 | 10 | 10 | 10 | 20 |
| Isocyanate-terminated prepolymer |  | Q | 519 | 519 | 431 | 519 | 902 |
|  |  | R | — | — | — | — | — |
| Molar ratio (NCO/OH) |  |  | 1.0 | 1.0 | 1.0 | 1.0 | 1.0 |

TABLE 7

|  | Example 1 | Comparative Example 1 | Comparative Example 2 |
|---|---|---|---|
| Resin premix viscosity (mPa · s at 25° C.) | 910 | 1050 | 1220 |

TABLE 8

|  | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|
| Demolding time (sec) | 480 | 490 | 420 | 380 | 380 | 660 | 540 | 550 | 530 | 500 |

TABLE 9-continued

|  | Example 1 | Example 2 | Example 3 | Example 4 | Example 5 |
|---|---|---|---|---|---|
| Surface characteristics | A | A | A | A | A |
| Coating characteristics | A | A | A | A | A |

TABLE 10

|  | Comparative Example 1 | Comparative Example 2 | Comparative Example 3 | Comparative Example 4 | Comparative Example 5 |
|---|---|---|---|---|---|
| Overall density (kg/m$^3$) | 510 | 510 | 510 | 510 | 510 |
| Average cell diameter on the skin surface ($\mu$m) | 65 | 70 | 75 | 72 | 80 |
| Diameter of inside cell ($\mu$m) | 25–110 | 20–90 | 20–90 | 25–100 | 30–150 |
| Average diameter of inside cell ($\mu$m) | 85 | 90 | 88 | 110 | 120 |
| Hardness (Asker C) | 72 | 70 | 70 | 71 | 74 |
| T$_B$ (MPa) | 2.2 | 3.4 | 3.6 | 3.8 | 4.9 |
| M$_{100}$ (MPa) | 1.8 | 2.2 | 2.3 | 2.6 | 2.7 |
| E$_B$ (%) | 280 | 340 | 350 | 350 | 340 |
| T$_R$ (kN/m) | 14 | 18 | 20 | 19 | 26 |
| CS (%) | 12 | 10 | 9 | 10 | 15 |
| CS2 (%) | 24 | 21 | 18 | 22 | 22 |
| Surface characteristics | C | B | C | B | B |
| Coating characteristics | C | B | B | B | B |

All of the microcellular polyurethane elastomers prepared by Examples 1 to 5 and Comparative Examples 1 to 5 had an overall density of 510 (kg/m$^3$), and the numerals of the correlations for the present invention between compression set (CS2) and overall density (D) are given below:

$$0.00008*D^2 - 0.091*D + 42 = 16.4$$

$$0.00008*D^2 - 0.091*D + 40 = 14.4$$

$$0.00008*D^2 - 0.091*D + 38 = 12.4$$

The numerals of the correlations for the present invention between cell diameter (X) and overall density (D) are given below:

$$120e^{-0.0015D} = 55.8$$

$$110e^{-0.0015D} = 51.2$$

$$100e^{-0.0015D} = 46.5$$

The mechanical properties of the microcellular polyurethane elastomers having an overall density of 350 (kg/m$^3$) are given in Table 11, wherein those prepared by Examples 6 and 7 had the same compositions as those prepared by Examples 1 and 2 (Table 5) and those prepared by Comparative Examples 6 to 8 had the same compositions as those prepared by Comparative Examples 1 to 3 (Table 6). Their quantities injected into the mold were adjusted to have the different overall density.

TABLE 11

|  | Example 6 | Example 7 | Comparative Example 6 | Comparative Example 7 | Comparative Example 8 |
|---|---|---|---|---|---|
| Overall density (kg/m$^3$) | 350 | 350 | 350 | 350 | 350 |
| Average cell diameter on the skin surface ($\mu$m) | 50 | 55 | 80 | 90 | 85 |
| Diameter of inside cell ($\mu$m) | 30–150 | 30–150 | 50–210 | 60–220 | 60–220 |
| Average diameter of inside cell ($\mu$m) | 95 | 95 | 150 | 145 | 155 |
| Hardness (Asker C) | 16 | 18 | 16 | 17 | 16 |
| TB (MPa) | 1.2 | 1.3 | 0.9 | 0.8 | 0.8 |
| EB (%) | 320 | 330 | 300 | 310 | 310 |
| TR (KN/m) | 6.0 | 5.9 | 4.9 | 5.1 | 4.8 |
| CS (%) | 8 | 9 | 17 | 13 | 12 |
| CS2 (%) | 10 | 13 | 28 | 24 | 23 |

The numerals of the correlations for the present invention between cell diameter (X) and overall density (D) are given below for the microcellular polyurethane elastomers prepared by Examples 6 and 7 and Comparative Examples 6 to 8 having an overall density of 350 (kg/m$^3$):

$$0.00008*D^2 - 0.091*D + 42 = 20.0$$

$$0.00008*D^2 - 0.091*D + 40 = 18.0$$

$$0.00008*D^2 - 0.091*D + 38 = 16.0$$

The numerals of the correlations for the present invention between cell diameter (X) and overall density (D) are given below:

$$120e^{-0.0015D} = 71.0$$

$$110e^{-0.0015D} = 65.1$$

$$100e^{-0.0015D} = 59.2$$

To explain these results: the microcellular polyurethane elastomers of the present invention, prepared by Examples 1 to 5, showed a shorter demolding time and hence greatly contributing to improvement of productivity than those using the polyoxyalkylene polyols polymerized in the presence of the conventional KOH catalyst (Comparative Example 1) and in the presence of the DMC catalyst (Comparative Examples 2 to 5), as shown in Table 8.

It is noted that the microcellular polyurethane elastomers of the present invention, prepared by Examples 1 to 5, show excellent mechanical properties, having a much higher tensile strength, 100% modulus, maximum elongation and tear strength, and a much lower compression set than those using the polyoxyalkylene polyols polymerized in the presence of the conventional KOH catalyst (Comparative Example 1) and in the presence of the DMC catalyst (Comparative Examples 2 to 5), as shown in Tables 9 and 10. Improved mechanical properties, and surface and coating characteristics are also noted with the microcellular polyurethane elastomer prepared by Example 4 which used the polymer-dispersed polyol and that prepared by Example 5 which used the aromatic polyester polyol as the isocyanate-terminated prepolymer modifier.

It is also noted that even the microcellular polyurethane elastomer of low overall density exhibited improved mechanical properties, because those prepared by Examples 6 and 7 have a much higher tensile strength, 100% modulus, maximum elongation and tear strength, and a much lower compression set than those prepared by Comparative Examples 6 to 8, as shown in Table 11.

The microcellular polyurethane elastomer satisfies the compression set (CS2) requirement for the present invention, when its cell diameter (X) on the skin surface is in the specific range. The cell diameter (X) is an important factor to have the microcellular polyurethane elastomer, exhibiting not only good surface characteristics as the important property but also excellent mechanical properties.

Use of the polyoxyalkylene polyol having a hydroxyl value (OHV), an overall degree of unsaturation and head-to-tail (H–T) linkage selectivity each in a specific range can easily give the microcellular polyurethane elastomer of excellent mechanical properties, i.e., greatly increased tensile strength, 100% modulus, maximum elongation and tear strength and greatly decreased compression set, and, at the same time, excellent surface and coating characteristics.

What is claimed is:

1. A microcellular polyurethane elastomer, having
   (1) an overall density (D) of 100 kg/m³ or more but 900 kg/m³ or less, and
   (2) overall density (D) and compression set (CS2, unit: %) satisfying a relationship shown by the following equation (1):

$$CS2 \leq 0.00008*D^2 - 0.091*D + 42 \qquad (1)$$

and having
   overall density (D) and average cell diameter (X, unit: μm) observed on a skin surface satisfying a relationship shown by the following equation (2):

$$X \leq 120e^{-0.0015D} \qquad (2).$$

2. The microcellular polyurethane elastomer as claimed in claim 1, wherein its overall density is 200 kg/m³ or more but 700 kg/m³ or less.

3. The microcellular polyurethane elastomer as claimed in claim 1, containing the cells having an average diameter of 1 μm or more but 200 μm or less.

4. The microcellular polyurethane elastomer as claimed in claim 1 or 2, wherein its overall density and compression set satisfy a relationship shown by the following equation (3):

$$CS2 \leq 0.00008*D^2 - 0.091*D + 40 \qquad (3).$$

5. The microcellular polyurethane elastomer as claimed in claim 1 or 2, wherein its average cell diameter (X, unit: μm) observed on the skin surface satisfies a relationship shown by the following equation (4):

$$X \leq 110e^{-0.0015D} \qquad (4).$$

6. A microcellular polyurethane elastomer having an overall density (D) of 100 kg/³ or more but 900 kg/m³ or less obtained by reacting a polyol with a polyisocyanate compound, wherein said polyol contains 50 wt. % or more of at least one polyoxyalkylene polyol having a hydroxyl value of 2 to 200 mg-KOH/g, an overall degree of unsaturation of 0.001 to 0.07 meq./g and a head-to-tail linkage selectivity of 95 mol % or more for that of the polyoxyalkylene polyol produced by addition polymerization of propylene oxide.

7. The microcellular polyurethane elastomer as claimed in claim 6, wherein said polyoxyalkylene polyol is produced in the presence of a compound having a P=N bond as a catalyst.

8. The microcellular polyurethane elastomer as claimed in claim 1, obtained by reacting a polyol with a polyisocyanate compound, wherein said polyol contains 50 wt. % or more of at least one polyoxyalkylene polyol having a hydroxyl value of 2 to 200 mg-KOH/g, an overall degree of unsaturation of 0.001 to 0.07 meq./g and a head-to-tail linkage selectivity of 95 mol % or more for that of the polyoxyalkylene polyol produced by addition polymerization of propylene oxide.

9. The microcellular polyurethane elastomer as claimed in claim 8, wherein said polyoxyalkylene polyol is produced in the presence of a compound having a P=N bond as a catalyst.

10. The microcellular polyurethane elastomer as claimed in claim 8, wherein said polyol contains 0.5 to 50 wt. % of polymer-dispersed polyol containing 1 to 50 wt. % of polymer micro particles produced by polymerization of at least one monomer containing an ethylenically unsaturated group.

11. The microcellular polyurethane elastomer as claimed in claim 10, wherein said polymer-dispersed polyol is produced by polymerization of at least one monomer containing an ethylenically unsaturated group in at least one polyoxyalkylene polyol having a hydroxyl value of 2 to 200 mg-KOH/g, an overall degree of unsaturation of 0.001 to 0.07 meq./g and a head-to-tail linkage selectivity of 95 mol % or more for that of the polyoxyalkylene polyol produced by addition polymerization of propylene oxide.

12. The microcellular polyurethane elastomer as claimed in claim 10 or 11, wherein said polymer-dispersed polyol contains 10 to 45 wt. % of said polymer micro particles.

13. The microcellular polyurethane elastomer as claimed in claim 10 or 11, wherein said monomer containing an ethylenically unsaturated group is one or more types of monomers selected from the group consisting of acrylonitrile, styrene, acrylamide and methyl methacrylate.

14. The microcellular polyurethane elastomer as claimed in claim 10 or 11, wherein said monomer containing an ethylenically unsaturated group contains 30 wt. % or more of styrene.

15. The microcellular polyurethane elastomer as claimed in claim 1, which is obtained by reacting an isocyanate-terminated prepolymer with a polyol, said prepolymer being obtained by reacting an aromatic polyester polyol with a polyisocyanate.

16. A shoe sole which is made of the microcellular polyurethane elastomer as claimed in claim 1.

17. A method of producing a microcellular polyurethane elastomer, obtained by reacting a polyol with a polyisocyanate compound to have
   (1) an overall density (D) of 100 kg/m³ or more but 900 kg/m³ or less, and
   (2) overall density (D) and compression set (CS2, unit: %) satisfying a relationship shown by the following equation (1)

$$CS2 \leq 0.00008*D^2 - 0.091*D + 42 \tag{1}$$

and to have overall density (D) and average cell diameter (X, unit: μm) observed on the skin surface satisfying a relationship shown by the following equation (2):

$$X \leq 120 e^{-0.0015^D} \tag{2}$$

wherein, said polyol contains 50 wt. % or more of at least one polyoxyalkylene polyol having a hydroxyl value of 2 to 200 mg-KOH/g, an overall degree of unsaturation of 0.001 to 0.07 meq./g and a head-to-tail linkage selectivity of 95 mol % or more for that of the polyoxyalkylene polyol produced by addition polymerization of propylene oxide.

18. The method of producing a finely foamed polyurethane elastmer as claimed in claim 17, wherein said polyoxyalkylene polyol is produced in the presence of a compound having a P=N bond as a catalyst.

19. The method of producing a finely foamed polyurethane elastmer as claimed in claim 17, which is obtained by reacting a polyol with a polyisocyanate compound, wherein said polyol contains 0.5 to 50 wt. % of polymer-dispersed polyol containing 1 to 50 wt. % of the polymer micro particles produced by polymerization of at least one monomer containing an ethylenically unsaturated group.

20. The method of producing a finely foamed polyurethane elastmer as claimed in any one of claims 17 to 19, which is obtained by reacting a polyol with a polyisocyanate compound, wherein said polyisocyanate compound is an isocyanate-terminated prepolymer obtained by reacting an aromatic polyester polyol with a polyisocyanate.

21. The method of producing a finely foamed polyurethane elastmer as claimed in claim 20, wherein said polyisocyanate compound contains 20 wt. % or more of the isocyanate-terminated prepolymer obtained by reacting an aromatic polyester polyol with a polyisocyanate.

* * * * *

UNITED STATES PATENT AND TRADEMARK OFFICE
CERTIFICATE OF CORRECTION

PATENT NO. : 6,437,013 B2
DATED : August 20, 2002
INVENTOR(S) : Kuwamura et al.

It is certified that error appears in the above-identified patent and that said Letters Patent is hereby corrected as shown below:

<u>Title page,</u>
Item [57], ABSTRACT,

Line 13, change " $X \leq 120e^{-0.0015^D}$ " to -- $X \leq 120e^{-0.0015D}$ --

<u>Column 3,</u>
Line 40, change " $X \leq 120e^{-0.0015^D}$ " to -- $X \leq 120e^{-0.0015D}$ --
Line 60, change " $X \leq 110e^{-0.0015^D}$ " to -- $X \leq 110e^{-0.0015D}$ --

<u>Column 5,</u>
Line 7, change " $X \leq 120e^{-0.0015^D}$ " to -- $X \leq 120e^{-0.0015D}$ --

<u>Column 6,</u>
Line 54, change " $X \leq 120e^{-0.0015^D}$ " to -- $X \leq 120e^{-0.0015D}$ --

Line 59, change " $X \leq 110e^{-0.0015^D}$ " to -- $X \leq 110e^{-0.0015D}$ --

Line 63, change " $X \leq 100e^{-0.0015^D}$ " to -- $X \leq 100e^{-0.0015D}$ --

<u>Column 27,</u>
Line 57, change " $120e^{-0.0015^D} = 55.8$ " to -- $120e^{-0.0015D} = 55.8$ --

Line 58, change " $110e^{-0.0015^D} = 51.2$ " to -- $110e^{-0.0015D} = 51.2$ --

Line 61, change " $100e^{-0.0015^D} = 46.5$ " to -- $100e^{-0.0015D} = 46.5$ --

<u>Column 28,</u>
Line 46, change " $120e^{-0.0015^D} = 71.0$ " to -- $120e^{-0.0015D} = 71.0$ --

Line 47, change $110e^{-0.0015^D} = 65.1$ " to -- $110e^{-0.0015D} = 65.1$ --

Line 49, change " $100e^{-0.0015^D} = 59.2$ " to -- $100e^{-0.0015D} = 59.2$ --

UNITED STATES PATENT AND TRADEMARK OFFICE
CERTIFICATE OF CORRECTION

PATENT NO. : 6,437,013 B2
DATED : August 20, 2002
INVENTOR(S) : Kuwamura et al.

It is certified that error appears in the above-identified patent and that said Letters Patent is hereby corrected as shown below:

Column 29,
Line 45, change "$X \leq 120e^{\text{-0.0015}^D}$" to -- $X \leq 120e^{-0.0015D}$ --

Line 54, change "$X \leq 110e^{\text{-0.0015}^D}$" to -- $X \leq 110e^{-0.0015D}$ --

Column 31,
Line 11, change "$X \leq 120e^{\text{-0.0015}^D}$" to -- $X \leq 120e^{-0.0015D}$ --

Signed and Sealed this

First Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,437,013 B2  
DATED : August 20, 2002  
INVENTOR(S) : Kuwamura et al.

It is certified that error appears in the above-identified patent and that said Letters Patent is hereby corrected as shown below:

Title page,
Item [57], ABSTRACT,

Line 13, change "$X \leq 120e^{-0.0015^D}$" to -- $X \leq 120e^{-0.0015D}$ --

Column 3,
Line 40, change "$X \leq 120e^{-0.0015^D}$" to -- $X \leq 120e^{-0.0015D}$ --
Line 60, change "$X \leq 110e^{-0.0015^D}$" to -- $X \leq 110e^{-0.0015D}$ --

Column 5,
Line 7, change "$X \leq 120e^{-0.0015^D}$" to -- $X \leq 120e^{-0.0015D}$ --

Column 6,
Line 64, change "$X \leq 120e^{-0.0015^D}$" to -- $X \leq 120e^{-0.0015D}$ --

Line 59, change "$X \leq 110e^{-0.0015^D}$" to -- $X \leq 110e^{-0.0015D}$ --

Line 63, change "$X \leq 100e^{-0.0015^D}$" to -- $X \leq 100e^{-0.0015D}$ --

Column 27,
Line 57, change "$120e^{-0.0015^D} = 55.8$" to -- $120e^{-0.0015D} = 55.8$ --

Line 58, change "$110e^{-0.0015^D} = 51.2$" to -- $110e^{-0.0015D} = 51.2$ --

Line 61, change "$100e^{-0.0015^D} = 46.5$" to -- $100e^{-0.0015D} = 46.5$ --

Column 28,
Line 46, change "$120e^{-0.0015^D} = 71.0$" to -- $120e^{-0.0015D} = 71.0$ --

Line 47, change $110e^{-0.0015^D} = 65.1$" to -- $110e^{-0.0015D} = 65.1$ --

Line 49, change "$100e^{-0.0015^D} = 59.2$" to -- $100e^{-0.0015D} = 59.2$ --

UNITED STATES PATENT AND TRADEMARK OFFICE
CERTIFICATE OF CORRECTION

PATENT NO. : 6,437,013 B2
DATED : August 20, 2002
INVENTOR(S) : Kuwamura et al.

It is certified that error appears in the above-identified patent and that said Letters Patent is hereby corrected as shown below:

Column 29,
Line 45, change "$X \leq 120e^{\underline{-0.0015^D}}$" to -- $X \leq 120e^{-0.0015D}$ --

Line 54, change "$X \leq 110e^{\underline{-0.0015^D}}$" to -- $X \leq 110e^{-0.0015D}$ --

Column 31,
Line 11, change "$X \leq 120e^{\underline{-0.0015^D}}$" to -- $X \leq 120e^{-0.0015D}$ --

This cetificate supersedes Certificate of Correction issued June 1, 2004.

Signed and Sealed this

Seventh Day of September, 2004

JON W. DUDAS
*Director of the United States Patent and Trademark Office*